O. O. G. Elliott,
Grinding Glass.
Nº 53,218. Patented Mar. 13, 1866.
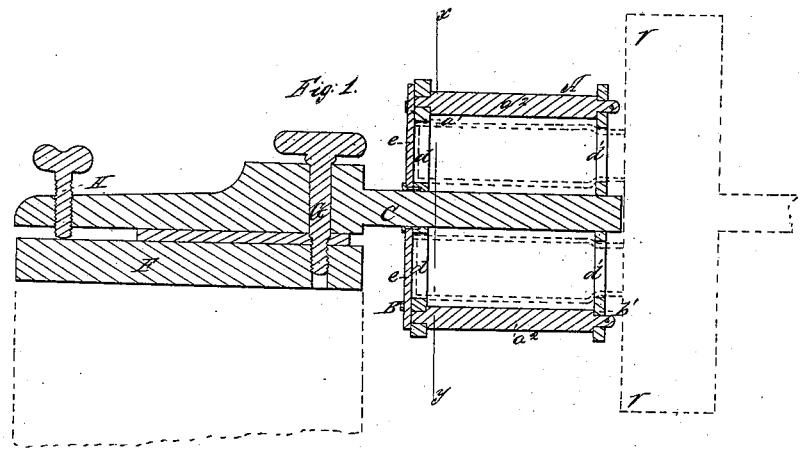
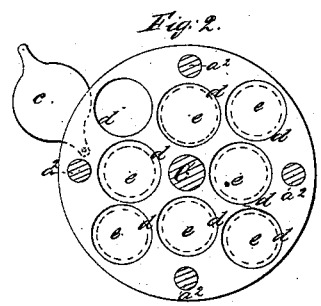
Witnesses:
Inventor:
Oliver O. G. Elliott

UNITED STATES PATENT OFFICE.

OLIVER O. G. ELLIOTT, OF PHILADELPHIA, PENNSYLVANIA, ASSIGNOR TO HIMSELF AND A. R. SAMUEL, OF SAME PLACE.

IMPROVED MODE OF GRINDING THE MOUTH-EDGES OF GLASS JARS.

Specification forming part of Letters Patent No. 53,218, dated March 13, 1866.

*To all whom it may concern:*

Be it known that I, OLIVER O. G. ELLIOTT, of the city of Philadelphia, in the State of Pennsylvania, have invented a new and Improved Mode of Grinding the Mouth-Edges of Glass Jars; and I do hereby declare that the following is a full and exact description of the same, reference being had to the accompanying drawings, making a part of this specification, in which—

Figure 1 is a vertical longitudinal section of the machine used, and Fig. 2 a transverse section on the dotted line $x\,y$ of Fig. 1, like letters of reference indicating the same parts when in both figures.

The nature of my invention consists in revolving simultaneously a series of glass jars around a central shaft or axis, with their mouth-edges in contact with the flat side of a rotating grinding-disk of any suitable material, whose axial line of motion corresponds in direction with the axial line around which the jars are revolved, for the purpose of facilitating and perfecting the operation of truing the mouth-edges of said jars.

Referring to the drawings, A B is a cylindrical frame consisting of two disks, $a'\,b'$, securely attached together by means of four or more stretchers, $a^2\,a^2$. These disks are each provided with a round hole in its center, and through both of these holes a cylindrical shaft, C, passes, and allows the frame A B to be easily slid along backward or forward and rotated upon it by hand. Each of the disks $a'\,b'$ is provided with a series of cylindrical holes, $d\,d$, arranged so that the holes in the disk $a'$ shall be, respectively, opposite to the holes in the disk $b'$, those in the disk $a'$ being large enough to admit the bottom ends of the jars to be ground, while those in the disk $b'$ are adapted in size to receive the smaller or mouth ends of the same, as indicated by the faint or green lines in Fig. 1. Each of the holes $d$ in the disk $a'$ is provided with an adjustable cover or armed disk, $e\,e$, whereby when the jar is inserted in place in the holes $d\,d'$ it will be prevented from being pushed out backward from the frame A B by the operation of grinding.

The shaft C can be turned horizontally around upon its supporting-base F, it being supported by a tightening-screw, G, and its rear end has an adjusting-screw, H, and consequently the position of the frame A B can be easily regulated so as to adjust the mouths of the jars properly against the grinding-disk, (represented by the faint lines $v\,v$ of Fig. 1.) The shaft C being firmly adjusted and fixed so as to hold the center of the forward end of the frame A B directly opposite to the center of rotation of a grinding-disk or emery-wheel, and the jars secured in the holes $d\,d'$, the whole of them, be they more or less than shown, can at once be pushed forward by hand into contact with the grinding-disk and rapidly ground true and even, the operator revolving them slowly and continually by rotating the frame A B by hand.

This is a very simple, effective, and expeditious mode of grinding and truing the mouth ends of glass jars, and is especially important for preparing the mouths of such glass jars as are required to be hermetically sealed for preserving fruit.

I am aware that the mouths of glass jars have before been ground singly by holding and rotating the jar by hand against a grinding-disk. Therefore I do not desire to claim, broadly, the grinding of the mouth-edge of a glass jar; but, Having fully described my improved mode, what I claim as my invention, and desire to secure by Letters Patent, is—

Grinding the mouth-edges of glass jars by simultaneously revolving a series of them against a grinding-disk in motion, substantially as and for the purposes described.

OLIVER O. G. ELLIOTT.

Witnesses:
 BENJ. MORISON,
 JAS. WINSMORE, Jr.